Sept. 14, 1926.  1,599,922
T. C. RATHBONE
BALANCING MACHINE
Filed Sept. 12, 1924  3 Sheets-Sheet 1
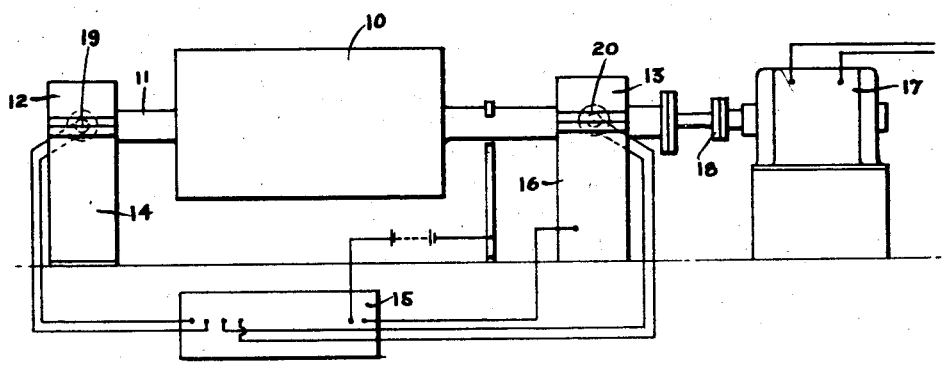
Fig. 1.
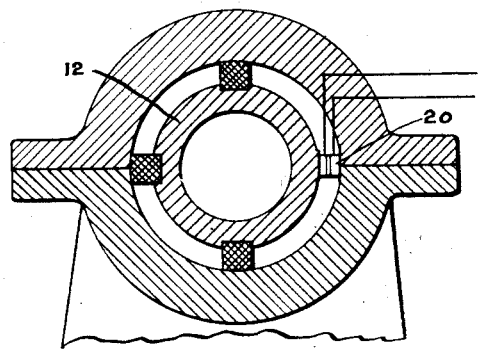
Fig. 2.
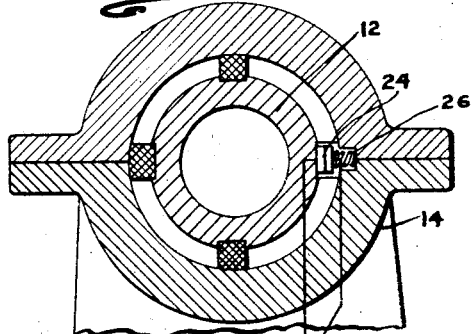
Fig. 3.
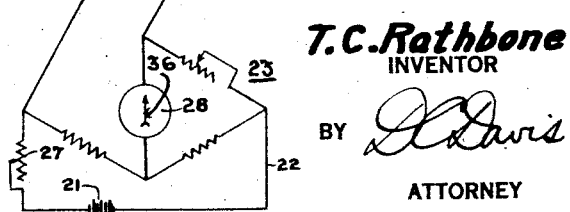
WITNESSES:
T. C. Rathbone
INVENTOR
BY
ATTORNEY Sept. 14, 1926.

T. C. RATHBONE

BALANCING MACHINE

Filed Sept. 12, 1924    3 Sheets-Sheet 2

1,599,922

WITNESSES:

T.C.Rathbone
INVENTOR

BY
ATTORNEY

Sept. 14, 1926.

T. C. RATHBONE

BALANCING MACHINE

Filed Sept. 12, 1924    3 Sheets-Sheet 3

1,599,922

WITNESSES:

T. C. Rathbone
INVENTOR

BY
ATTORNEY

Patented Sept. 14, 1926.

1,599,922

UNITED STATES PATENT OFFICE.

THOMAS C. RATHBONE, OF RIDLEY PARK, PENNSYLVANIA, ASSIGNOR TO WESTINGHOUSE ELECTRIC & MANUFACTURING COMPANY, A CORPORATION OF PENNSYLVANIA.

BALANCING MACHINE.

Application filed September 12, 1924. Serial No. 737,439.

My invention relates to apparatus for determining the condition of balance in a rotary body and has for its object the provision of apparatus of the character designated which shall be simple of operation and which shall give extremely accurate results.

Figure 4:
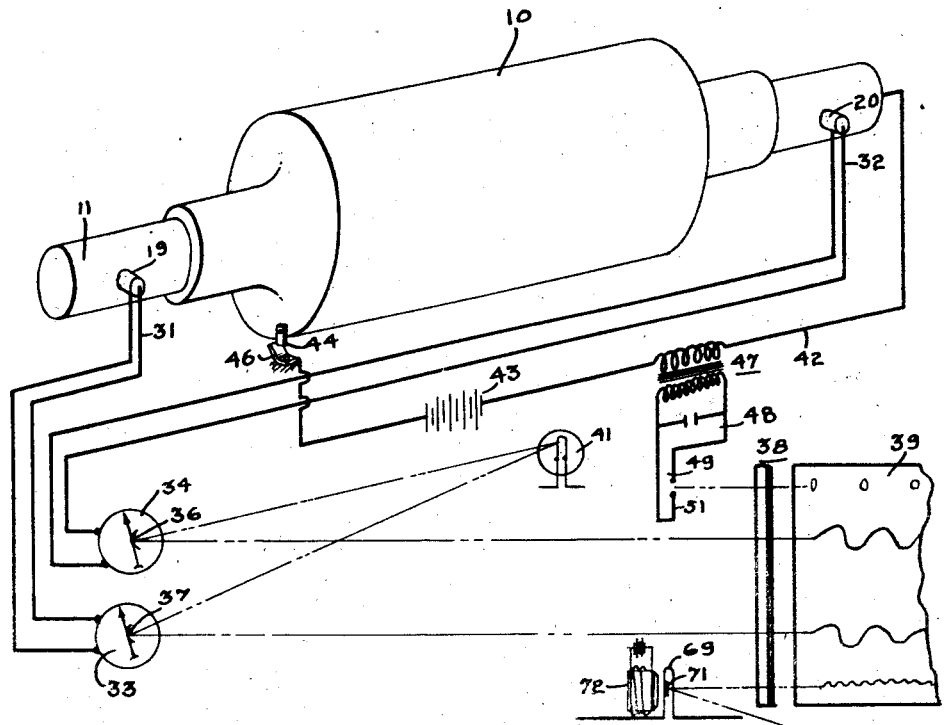
Figure 6:
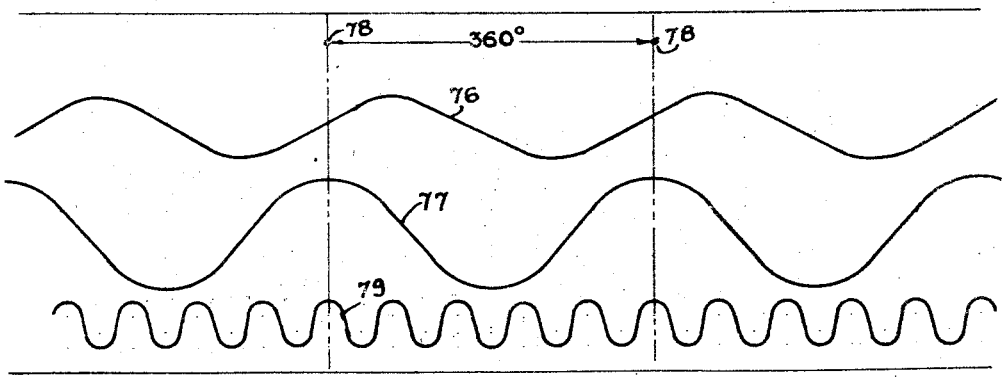
Figure 5:
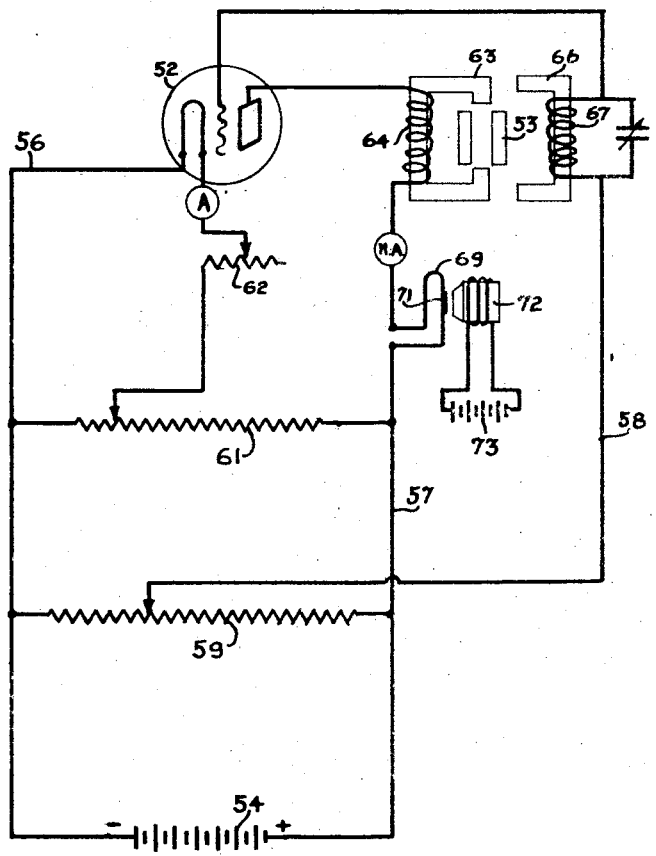

Apparatus made in accordance with my invention is illustrated in the accompanying drawings forming a part of this application in which Fig. 1 is a view in elevation showing the invention in position for operation; Fig. 2 is a fragmentary view showing the application of one form of pressure gauge employed with my apparatus; Fig. 3 is a view similar to Fig. 2 and showing another form of pressure gauge which may be employed; Fig. 4 is a diagrammatic view explanatory of the operation of the apparatus; Fig. 5 is a diagrammatic view of a chronographic mechanism with its electrical circuits employed with my invention; and Fig. 6 is a view of a graphic representation of the condition of balance in a body as produced by my invention.

Heretofore, the process of determining the condition of dynamic balance in a rotary body, as known to me, has consisted in placing the body on some form of vibratory support and rotating the body; if the body is in an unbalanced condition the supports therefor vibrate. Observations are then made as to the amplitude of the vibrations and weights are either added at selected points on the body and their influence on the amplitude of the vibrations noted, or else some form of mechanism is provided whereby the vibrations induced by the rotation of an unbalanced mass in the body are opposed and damped out. Means have also been proposed for first locating the plane of unbalance and then adding weights to the body at selected points thereon, noting the influence of the weights over the plane of unbalance and from the data thus obtained computing the magnitude of unbalance in the body.

In any of the methods heretofore proposed the operation of determining the location of the plane and the magnitude of unbalance in a body has comprised several steps requiring a relatively long period of time with very accurate observations and calculations necessary in order to secure satisfactory results.

In accordance with my present invention I employ an electrical pressure gauge for determining the magnitude of the unbalanced forces in the body. Associated with the electrical pressure gauge is a recording galvanometer, that is, a galvanometer having associated therewith a camera provided with a rapidly moving film, a source of light and a reflector carried by the galvanometer needle, whereby its deflections are photographically reproduced on the film in the form of curves.

In order to determine the plane of the unbalanced force a datum point is photographed upon the film, said datum point being made at the instant a given circumferential point on the body passes a fixed point without the body. Inasmuch as the magnitude of the unbalanced force in a body is a function of the speed of the body, it is very important in making observations to know the exact speed of the body in rotation. I accordingly provide a chronographic mechanism having an oscillating member with a predetermined period, the oscillations of which are photographically represented upon the moving film in the form of curves simultaneously with the galvanometer deflections. By comparing these time curves with the force curves the exact speed of the body at the time the test is made may be readily determined.

The electric pressure gauge employed in my invention may be any one of several forms known to the art. Preferably, I employ a piezo electric gauge and a recording galvanometer such as is described in scientific papers of the U. S. Bureau of Sandards, No. 445, published August 4, 1922. Another electrical method of measuring force or pressure which I may employ is described in technologic papers of the Bureau of Standards, No. 247, published January 4, 1924, wherein a stack of carbon plates is introduced into one leg of the well-known Wheatstone bridge. The carbon plates are then subjected to the variable force to be measured and the variable resistance resulting therefrom measured by means of a recording galvanometer.

The chronographic mechanism which I employ with my invention in order to record a predetermined unit of time concomitantly with the other data, is well described in the before-mentioned scientific papers of the Bureau of Standards and in a publication by Messrs. Eckhardt, J. C. Karcher and M. Keiser in the Journal of the Optical Society of America and Review of Scientific Instruments, volume 6, No. 9, November 1922 (page 949 et seq.).

For the sake of brevity in the following specification, detailed description of the construction and operation of the above mentioned devices will be limited and reference is herewith made to the before-mentioned publications for a more extended description.

Referring now to the drawings for a better understanding of my invention, I show in Fig. 1 at 10 a body to be balanced, said body having a shaft 11 riding in bearings 12 and 13 at each end thereof. The bearings are in turn supported by means of supports 14 and 16. The body 10 may be rotated by any suitable means, for example, as by a motor 17 through a suitable flexible driving means 18, although it will be apparent that the invention is applicable to a rotating apparatus driven by its own power, as to a steam turbine in operation under service conditions. At 15 is shown a box-like casing which encloses the recording galvanometers, chronographic mechanism, camera, and means for photographing a datum point upon the moving film of the camera, employed with my invention and preventing outside light from interfering with the photographing of the various data.

Interposed between the bearings 12 and 13 and their associated supports 14 and 16 are electric pressure gauges 19 and 20 (shown in dotted lines), one of which is more fully illustrated in Fig. 2. The pressure gauges 19 and 20 serve to vary the current flow in associated electrical circuits in response to varied pressure thereon. It will be seen that as the body 10 is rotated, force impulses due to an unbalanced mass therein are imposed upon the bearings 12 and 13. As the force impulse of the unbalanced mass in the body in rotation passes the plane of the pressure gauges, the force impulse is impressed upon the pressure gauges, becoming less in magnitude as the force impulse of unbalance leaves the plane of the pressure gauges. The pressure gauges illustrated in Figs. 1 and 2 are of the form prescribed in the before-mentioned scientific papers of the Bureau of Standards. In accordance with this form the gauge comprises a pile of quartz discs which liberate an electro-motive force proportional to variations in the pressure thereon, said electro-motive force being registered by a galvanometer in an electrical circuit associated with the pressure gauge.

In Fig. 3 I show another form of pressure gauge which may be employed. In this figure, 21 represents a source of electrical energy having a circuit 22 leading therefrom. Associated with the circuit 22 is a Wheatstone bridge 23, one leg of which has included therein a resistor 24 composed of a pile of carbon plates. The resistor 24 is interposed between the bearing 12 and its support 14.

In order to maintain some pressure upon the resistor 24 at all times I insert a spring 26 between said resistor and the support 14. An adjustable resistor 27 serves to control the circuit 22. With this form of pressure gauge, periodic impulses due to unbalance in the body 10 in rotation are impressed upon the resistor 24, varying the flow of electric current through that leg of the Wheatstone bridge in which it is inserted. Variations in the flow of current through the resistor 24 cause a flow of current through a galvanometer 28 varying with the pressure upon the resistor 24. Deflections of the galvanometer are photographed upon the film in a manner to be described later.

Referring to Fig. 4, I show the pressure gauges 19 and 20 having electrical circuits 31 and 32 leading therefrom. The circuits 31 and 32 have galvanometers 33 and 34 included therein, the moving systems of which have attached thereto small concave mirrors 36 and 37. At 38 is shown a camera, said camera being provided with a rapidly moving film 39, the film being shown in the drawing at right angles to its true position in the camera. At 41 is shown a source of light, rays from which are reflected upon the moving film 39 by the mirrors 36 and 37 of the galvanometers 33 and 34. As the galvanometers 33 and 34 deflect in response to variations in pressure upon the pressure gauges 19 and 20, the light beams reflected by the mirrors 36 and 37 are simultaneously photographed upon the film 39 as force curves having a general parallel direction. These force curves may be calculated in terms of any convenient unit as for example, in inch ounces, whereby the magnitude of the unbalanced force in the body 10 may be readily read from the graphic representation thereof upon the film 39.

In order to locate the plane of the periodic impulses due to unbalance of the body 10, I employ an electrical circuit 42 leading from a source of electrical energy 43 and passing through the body 10. Included in the circuit 42 is a contact member 44 attached to some convenient rotating part, as to the body 10, and a second contact member 46 attached to some stationary part. It will be seen that as the body 10 rotates, the circuit 42 is completed and broken at each revolution thereof. By photographically representing the completion of the circuit 42 on the moving film 39, concomitantly with the pulsations in the electric current produced by the electric gauges 19 and 20, a graph is produced in which the point made at the completion of the circuit 42 represents the plane of the contact member 44 and by reference to this point the location of the plane of the unbalanced forces may be readily determined. In order to photographically represent the completion of the circuit 42, I show an induction coil at 47 included in the circuit 42. Leading from the secondary of the induction coil 47 is a circuit 48 included in which are two electrodes 49 and 51 having a gap between, across which a spark jumps upon the breaking of the circuit 42. The electrodes 49 and 51 are arranged in front of the camera 38 so that upon the breaking of the circuit 42 the spark is photographed upon the film 39.

In order to have a permanent record of the speed at which the body 10 is rotating at the time it is tested, I show in Fig. 5 at 52 an electron tube employed for driving a tuning fork 53. A source of electrical energy 54 supplies current for the electron tube 52 through a filament circuit 56, a plate circuit 57 and a grid circuit 58. A rheostat 59 controls the grid circuit 58 and rheostats 61 and 62 control the filament circuit 56. Included in the plate circuit 57 is a driving electro-magnet 63 having a coil 64, the tuning fork 53 being disposed between the poles of said electro-magnet. Included in the grid circuit 58 is a laminated iron yoke 66 disposed opposite the electro-magnet 63 and having a coil 67 so as to form an inductive couple with the electro-magnet 63. A condenser is connected across the grid coil 67 for tuning purposes.

At 69 is shown an oscillating member of a well-known form of oscillograph, said oscillating member being included in the plate circuit 57. A small mirror 71 is carried by the oscillating member 69. Disposed opposite the oscillating member 69 is a field magnet 72 which is energized by an electrical circuit 73. In operation, with the filament of the electron tube 52 lighted, when the plate circuit 57 is closed, current flows through the driving electro-magnet 63, causing the prongs of the tuning fork 53 to vibrate. Vibrations of the tuning fork 53 vary the reluctance of the magnetic circuit, the reluctance being determined by and in synchronism with the free period of the fork. Corresponding changes in the plate current result, which by virtue of the coupling existing between the plate circuit 57 and the grid circuit 58, are regeneratively amplified. The alternating component of the plate current, as its growth progresses, causes the fork 53 to vibrate with progressively greater amplitudes, in this way accelerating the regenerating action until limited by the properties of the tube 52. Changes in the plate current 57 cause the oscillating member 69 with its mirror 71 to oscillate in synchronism therewith. Inasmuch as the changes in the plate current are determined by the tuning fork period, which is constant, the period of oscillation of the member 69 is constant.

Referring again to Fig. 4, I show at 74 a source of light, preferably a small arc light, the rays from which are reflected by the mirror 71 upon the film 39. As the member 69 oscillates, its oscillations are photographically represented upon the film 39 in the form of a time curve, changes in which are determined by the free period of the tuning fork 53.

From the foregoing description the operation of the apparatus will be apparent. With either the pressure gauges 19 and 20 or with carbon resistors 24 in position at each end of the body to have impressed thereon periodic impulses due to unbalance in the body to be tested, the body is rotated and the force impulses due to its unbalance are graphically recorded upon the film 39 in a manner already described. Fig. 6 shows a typical record of the operation in which 76 and 77 are the curves representing the force impulses at the two ends of the body being tested. As the body being tested is rotated, the circuit 42 is completed and broken at each revolution thereof causing a spark at the electrodes 49 and 51 which is photographed upon the film 39 making a reference point 78 at each revolution upon said film from which the plane of the force impulses may be readily determined. Simultaneously with the photographing of the force curves 76, oscillations of the member 69 are photographically represented upon the film 39 by the curve 79. From the time curve 79 the number of revolutions per minute of the body at the time of the test may be readily computed.

From the graphic representation illustrated in Fig. 6, it will be evident that the location of the plane of unbalance, the magnitude thereof and the speed of the rotation of the body being tested may be readily and accurately determined, after which the corrective weights to be added or material to be removed in order to place the body 10 in running balance may be computed in a manner well-known in the art.

From the foregoing, it will be apparent that I have invented an improved balancing apparatus, simple of operation and with which extremely accurate results may be quickly obtained.

While I have shown my invention in but two forms, it will be obvious to those skilled in the art that it is not so limited, but is susceptible of various other changes and modifications, without departing from the spirit thereof, and I desire, therefore, that only such limitations shall be placed there-

What I claim is:

1. The combination with a rotary body, of means responsive to periodic impulses caused by rotation of an unbalanced mass in the body for varying an electro-motive force, means for registering and recording the strength of said electro-motive force, and means for recording the position of a given circumferential point on the body relative to the periodic impulses.

2. The combination with a rotary body, of means responsive to periodic impulses caused by rotation of an unbalanced mass in the body for generating an electro-motive force, means for registering and recording the strength of said electro-motive force, means for recording the position of a given circumferential point on the body relative to the periodic impulses, and means for registering and recording the number of periodic impulses per unit of time.

3. In apparatus for determining the location of the plane and the magnitude of an unbalanced mass in a rotary body, an electric pressure measuring device, means for impressing upon the pressure measuring device impulses due to rotation of the unbalanced mass, means for registering and recording the electro-motive force produced by said impulses, an electrical circuit, means for momentarily completing said circuit in timed relation to the rotation of the body, and means for recording the completion of said circuit with relation to the impulses.

4. In apparatus for determining the location and magnitude of an unbalanced mass in a rotary body, an electric pressure measuring device, means for impressing upon the electric pressure measuring device impulses due to rotation of the unbalanced mass, means for registering and recording variations in the electro-motive force produced by said impulses, an electrical circuit, means for momentarily completing said circuit in timed relation to the rotation of the body, means for recording the completion of said circuit with relation to the impulses, an oscillating member having a predetermined period of oscillation, and means for recording the oscillations of said member relative to the impulses due to unbalance of the body.

5. In a machine for determining the condition of balance of a rotary body, an electric force measuring apparatus, means for imposing upon the force measuring apparatus vibratory forces induced by the body in motion, an electrical circuit, a stationary member associated with the body, a contact member included in the circuit and carried by the stationary member, a second contact member included in the circuit and carried by the rotary body, whereby the circuit is completed and broken at each revolution of the body, illuminating means responsive to the completion of the circuit, a galvanometer for measuring the vibratory forces registered by the force measuring apparatus in response to the vibratory forces, a camera provided with a rapidly moving film, and means for simultaneously recording deflections of the galvanometer and completion of the electrical circuit upon said film.

6. In a machine for determining the condition of balance of a rotary body, an electric force measuring apparatus, means for imposing upon the force measuring apparatus vibratory forces induced by the body in motion, an electrical circuit, a stationary member associated with the body, a contact member included in the circuit and carried by the stationary member, a second contact member included in the circuit and carried by the rotary body, whereby the circuit is completed and broken at each revolution of the body, illuminating means responsive to the completion of the circuit, a galvanometer for measuring the vibratory forces registered by the force measuring apparatus, an oscillating member having a predetermined period of oscillation, a camera provided with a rapidly moving film, and means for simultaneously recording deflections of the galvanometer, completion of the electrical circuit and oscillations of the oscillating member upon said film.

7. The combination with a rotary body having a shaft and a bearing, of a piezo-electric gauge associated with the shaft and the bearing, whereby vibratory forces of the body in rotation are imposed upon said gauge, a recording galvanometer for measuring the electro-motive force liberated by said gauge in response to the vibratory forces, and means for registering and recording the position of a given circumferential point on the body relative to the vibratory forces.

8. The combination with a rotary body having a shaft and a bearing, of a piezo-electric gauge associated with the shaft and the bearing, whereby vibratory forces of the body in rotation are imposed upon said gauge, a recording galvanometer for measuring the electro-motive force liberated by said gauge in response to the vibratory forces, means for registering and recording the position of a given circumferential point on the body relative to the vibratory forces, and means for registering and recording a definite time unit relative to the vibratory forces and to the rotation of the body.

9. In a machine for recording varying impulses due to unbalance of a rotary body, a photographic mechanism provided with a rapidly moving film, a piezo-electric gauge associated with the body for liberating an electro-motive force in response to the varying impulses, a galvanometer associated with the piezo-electric gauge, chronographic mechanism for registering a predetermined time unit, mechanism for registering the moment of passing of a given circumferential datum point on the body in rotation past a fixed point without the body, and mechanism for concomitantly recording on the rapidly moving film deflections of the galvanometer, the predetermined time unit, and the moment of passing of the circumferential datum point.

10. In a balancing machine for a rotary body having a shaft, a bearing for the shaft, and a support for the bearing, means for rotating the body whereby forces due to unbalance thereof are impressed upon the bearing, a piezo-electric gauge interposed between the bearing and its support and subjected to the forces due to unbalance, an electrical circuit associated with the piezo-electric gauge and having included therein a recording galvanometer, a second electrical circuit, contact elements included in said second electrical circuit and carried by the rotary body and a stationary part associated therewith, respectively, whereby said second electrical circuit is completed and broken at each revolution of the body, and means for registering and recording the completion and the breaking of said second electrical circuit concomitantly with the recording of the deflections of the galvanometer.

11. In a balancing machine for a rotary body having a shaft, a bearing for the shaft, and a support for the bearing, means for rotating the body, whereby forces due to unbalance thereof are impressed upon the bearing, a piezo-electric gauge interposed between the bearing and its support and subjected to the forces due to unbalance, an electrical circuit associated with the piezo-electric gauge and having included therein a recording galvanometer, a second electrical circuit, contact elements included in said second electrical circuit and carried by the rotary body and a stationary part associated therewith, respectively, whereby said second electrical circuit is completed and broken at each revolution of the body, an oscillating mechanism having a predetermined period of oscillation, and means for registering and recording the completion and the breaking of said second electrical circuit and the oscillations of said oscillating mechanism concomitantly with the recording of the deflections of the galvanometer.

12. In a balancing machine for a rotary body having a shaft, bearings for the shaft at each end of the body and supports for the bearings, means for rotating the body, whereby forces due to unbalance thereof are impressed upon the bearings, a piezo-electric gauge interposed between each of the bearings at its support, said gauges being subjected to the forces due to unbalance of the body in rotation, an electrical circuit associated with each of the piezo-electric gauges, each of said circuits having included therein a recording galvanometer, said galvanometers having a common recording means, an intermittenly open and closed electrical circuit, contact elements included in said last mentioned circuit and carried by the rotary body and a stationary part associated therewith, respectively, whereby said circuit is completed and broken at each revolution of the body, and means for registering and recording the completion and the breaking of said second electrical circuit concomitantly with the recording of the deflections of the galvanometers.

13. In a balancing machine for a rotary body having a shaft, bearings for the shaft at each end of the body and supports for the bearings, means for rotating the body, whereby forces due to unbalance thereof are impressed upon the bearings, a piezo-electric gauge interposed between each of the bearings and its support, said gauges being subjected to the forces due to unbalance of the body in rotation, an electrical circuit associated with each of the piezo-electric gauges, each of said circuits having included therein a recording galvanometer, said galvanometers having a common recording means, an intermittenly open and closed electrical circuit, contact elements included in said last mentioned circuit and carried by the rotary body and a stationary part associated therewith, respectively, whereby said circuit is completed and broken at each revolution of the body, an oscillating mechanism having a predetermined period of oscillations, and means for registering and recording the completion and the breaking of said second electrical circuit and the oscillations of said oscillating mechanism concomitantly with the recording of the deflections of the galvanometers.

14. The combination with a rotary body, of means for rotating the body, means responsive to periodic impulses caused by rotation of an unbalanced mass in the body for varying an electro-motive force, mechanism for closing and opening an electrical circuit in timed relation to the periodic impulses, and means for graphically representing in a common record variations in the electro-motive force varied in response to the periodic impulses and the closing and the opening of the electrical circuit.

15. The combination with a rotary body, of means for rotating the body, means responsive to periodic impulses caused by rotation of an unbalanced mass in the body for varying an electro-motive force, mechanism for periodically completing an electrical circuit in timed relation to the periodic impulses, an oscillating member having a predetermined period of oscillation, and means for embodying in a single graphic representation pulsations in the electro-motive force, the compression of the electrical circuit and oscillations of the oscillating member.

16. The combination with a rotary body, of means for mounting the body for rotation and permitting it to move under yielding control, a pressure gauge associated with each end of the body and subjected to the variable forces induced by the rotation of an unbalanced mass in the body, and means for embodying in a single graphic representation variations in the forces registered by the pressure gauges.

17. The combination with a rotary body, of means for mounting the body for rotation and permitting it to move under yielding control, a pressure gauge associated with each end of the body and subjected to the variable forces induced by the rotation of an unbalanced mass in the body, means for embodying in a single graphic representation variations in the forces registered by the pressure gauges, and means for embodying in said graphic representation the position of a given circumferential point on the body relative to said variable forces.

18. The combination with a rotary body, of means for mounting the body for rotation and permitting it to move under yielding control, a pressure gauge associated with each end of the body and subjected to the variable forces induced by the rotation of an unbalanced mass in the body, means for embodying in a single graphic representation, variations in the forces registered by the pressure gauges, means for embodying in said graphic representation the position of a given circumferential point on the body relative to said variable forces, and means for embodying in said graphical representation a predetermined time unit.

19. The combination with a rotary body, of means for mounting the body for rotation and permitting it to move under yielding control, a pressure gauge associated with each end of the body and subjected to the variable forces induced by the rotation of an unbalanced mass in the body, means for embodying in a single graphic representation, variations in the forces registered by the pressure gauges, means for embodying in said graphic representation the position of a given circumferential point on the body relative to said variable forces, an oscillating member having a constant period of oscillation, and means for embodying in said graphical representation a record of the oscillations of said member.

20. The method of determining the condition of balance in a rotary body comprising rotating the body, and concomitantly registering and recording vibratory forces due to unbalance of the body and the position of a given circumferential datum point on the body relative to the plane of said vibratory forces.

21. The method of determining the condition of balance in a rotary body comprising rotating the body, and concomitantly registering and recording vibratory forces due to unbalance of the body, the position of a given circumferential datum point on the body relative to the plane of said vibratory forces and a predetermined time unit.

22. The method of determining the condition of balance in a rotary body comprising rotating the body, and concomitantly registering and recording in a single graphic representation vibratory forces due to unbalance of the body, the position of a given circumferential datum point on the body relative to the plane of said vibratory forces and a predetermined time unit.

23. The method of determining the condition of balance in a rotary body comprising rotating the body, and concomitantly registering and recording in a single graphic representation vibratory forces due to unbalance of the body, the position of a given circumferential datum point on the body relative to the plane of said vibratory forces, a predetermined time unit and the vibrations of an oscillating member having a predetermined period of oscillation, whereby the magnitude of the variable force exerted, the plane, wherein the force is of lesser or greater magnitude and the rate of said force expressed in units of time may be observed.

24. The method of determining the condition of balance in a rotary body comprising rotating the body, and concomitantly registering and embodying in a single graphic representation periodic force impulses induced at both ends of the body by the rotation of an unbalanced mass therein, the position of a given datum point on the body relative to said impulses and the oscillations of an oscillating member having a predetermined period of oscillation.

In testimony whereof, I have hereunto subscribed my name this second day of September 1924.

THOMAS C. RATHBONE.